United States Patent
Takacs et al.

(10) Patent No.: US 8,687,891 B2
(45) Date of Patent: Apr. 1, 2014

(54) METHOD AND APPARATUS FOR TRACKING AND RECOGNITION WITH ROTATION INVARIANT FEATURE DESCRIPTORS

(75) Inventors: Gabriel Takacs, Santa Clara, CA (US); Radek Grzeszczuk, Menlo Park, CA (US); Vijay Chandrasekhar, Stanford, CA (US); Bernd Girod, Stanford, CA (US)

(73) Assignees: Stanford University, Stanford, CA (US); Nokia Corporation, Espoo (FI)

( * ) Notice: Subject to any disclaimer, the term of this patent is extended or adjusted under 35 U.S.C. 154(b) by 161 days.

(21) Appl. No.: 12/949,455

(22) Filed: Nov. 18, 2010

(65) Prior Publication Data

US 2011/0286627 A1 Nov. 24, 2011

Related U.S. Application Data

(60) Provisional application No. 61/262,740, filed on Nov. 19, 2009.

(51) Int. Cl.
*G06K 9/46* (2006.01)
(52) U.S. Cl.
USPC .......................................... 382/190; 382/240
(58) Field of Classification Search
USPC ............................................................ 382/190
See application file for complete search history.

(56) References Cited

U.S. PATENT DOCUMENTS

| | | | |
|---|---|---|---|
| 6,385,332 B1 * | 5/2002 | Zahalka et al. | 382/128 |
| 6,643,387 B1 * | 11/2003 | Sethuraman et al. | 382/107 |
| 6,694,311 B1 * | 2/2004 | Smith | 1/1 |
| 6,711,293 B1 | 3/2004 | Lowe | |
| 6,888,965 B1 * | 5/2005 | Rath et al. | 382/173 |
| 7,130,446 B2 * | 10/2006 | Rui et al. | 382/103 |
| 7,162,338 B2 | 1/2007 | Goncalves et al. | |
| 7,668,376 B2 * | 2/2010 | Lin et al. | 382/190 |
| 7,738,705 B2 * | 6/2010 | Casadei | 382/181 |
| 7,761,466 B1 * | 7/2010 | Eshghi | 707/772 |
| 7,822,264 B2 * | 10/2010 | Balslev et al. | 382/154 |

(Continued)

FOREIGN PATENT DOCUMENTS

| | | | |
|---|---|---|---|
| EP | 1276324 A2 | 1/2003 | |
| EP | 1548616 A2 | 6/2005 | |

(Continued)

OTHER PUBLICATIONS

Lazebnik et al., IEEE 2006, "Beyond bags of features: Spatial pyramid matching for recognizing natural scene categories", pp. 1-8.*

(Continued)

*Primary Examiner* — Manav Seth
(74) *Attorney, Agent, or Firm* — Alston & Bird LLP

(57) ABSTRACT

Various methods for tracking and recognition with rotation invariant feature descriptors are provided. One example method includes generating an image pyramid of an image frame, detecting a plurality of interest points within the image pyramid, and extracting feature descriptors for each respective interest point. According to some example embodiments, the feature descriptors are rotation invariant. Further, the example method may also include tracking movement by matching the feature descriptors to feature descriptors of a previous frame and performing recognition of an object within the image frame based on the feature descriptors. Related example methods and example apparatuses are also provided.

17 Claims, 8 Drawing Sheets

(56) References Cited

U.S. PATENT DOCUMENTS

| | | | |
|---|---|---|---|
| 7,831,094 B2 * | 11/2010 | Gupta et al. | 382/190 |
| 8,131,074 B2 * | 3/2012 | Owechko | 382/170 |
| 8,165,401 B2 | 4/2012 | Funayama et al. | |
| 8,165,407 B1 * | 4/2012 | Khosla et al. | 382/224 |
| 8,189,866 B1 * | 5/2012 | Gu et al. | 382/103 |
| 8,244,044 B2 * | 8/2012 | Hua et al. | 382/224 |
| 8,285,118 B2 * | 10/2012 | Bronstein et al. | 386/262 |
| 8,306,366 B2 * | 11/2012 | Kwon et al. | 382/304 |
| 8,336,761 B1 * | 12/2012 | McCloskey | 235/375 |
| 8,351,649 B1 * | 1/2013 | Medioni et al. | 382/103 |
| 8,358,840 B2 * | 1/2013 | Bronstein et al. | 382/170 |
| 8,363,973 B2 * | 1/2013 | Liu et al. | 382/266 |
| 8,396,286 B1 * | 3/2013 | Aradhye et al. | 382/159 |
| 2003/0121035 A1 * | 6/2003 | Ro | 725/28 |
| 2005/0025364 A1 * | 2/2005 | Kim et al. | 382/190 |
| 2007/0009159 A1 | 1/2007 | Fan | |
| 2008/0212873 A1 * | 9/2008 | Allen | 382/162 |
| 2010/0011392 A1 * | 1/2010 | Bronstein et al. | 725/28 |
| 2011/0038545 A1 * | 2/2011 | Bober et al. | 382/190 |

FOREIGN PATENT DOCUMENTS

| | | |
|---|---|---|
| EP | 1594078 A2 | 11/2005 |
| EP | 1850270 A1 | 10/2007 |
| KR | 10-2009-0074690 A | 7/2009 |
| WO | 03065063 A2 | 8/2003 |
| WO | 2007128452 | 11/2007 |
| WO | 2007130688 | 11/2007 |
| WO | 2009129243 A1 | 10/2009 |

OTHER PUBLICATIONS

Ahonen et al., "Rotation invariant image description with local binary pattern histogram fourier features," in Image Analysis, SCIA 2009 Proceedings, Lecture Notes in Computer Science 5575, 2009, pp. 61-70.

Nguyen et al., "SURFTrac: Efficient Tracking and Continuous Object Recognition using Local Feature Descriptors", IEEE CVPR 2009, Miami, Florida (2009).

Banerjee et al., "Clustering with bregman divergences," in Journal of Machine Learning Research, 2004, pp. 234-245.

Takacs et al., "Outdoors augmented reality on mobile phone using loxel-based visual feature organization", In Proceeding of ACM international conference on Multimedia Information Retrieval (MIR), pp. 427-434, 2008.

Chandrasekhar et al., "CHoG: Compressed histogram of gradients—Low Bit-Rate Feature Descriptors", Conference: Computer Vision and Pattern Recognition—CVPR, pp. 2504-2511, 2009.

Bay et al., "SURF: Speeded Up Robust Features," in ECCV (1), 2006, pp. 404-417.

Birchfield, "KLT: An Implementation of the Kanade-Lucas-Tomasi Feature Tracker," 2007, http://www.ces.clemson.edu/~stb/klt.

Brasnett et al., "A Robust Visual Identifier Using the Trace Transform," in Visual Information Engineering Conference (VIE), Jul. 2007.

Brown et al., "Automatic Panoramic Image Stitching Using Invariant Features," in International Journal of Computer Vision, vol. 74, No. 1, 2007, pp. 59-77.

Calonder et al., "Compact Signatures for High-speed Interest Point Description and Matching," in Proc. International Conf. on Computer Vision (ICCV), 2009.

Huang et al., "Image Retrieval by Texture Similarity", Pattern Recognition, Elsevier, Mar. 2003, vol. 36, No. 3, pp. 665-679.

Chang et al., "Direction Adaptive Partitioned Block Transform for Image Coding," in Proceedings of ICIP 2008, San Diego, USA, 2008.

Tao et al., "Recognition and Retrieval of Textured Images Using Gradient Indexing", Image Processing, Proceedings, Oct. 4, 1998, vol. 1, pp. 57-61, International Conference on Chicago, IL, USA, Oct. 1998.

Yeo et al., "Rate-Efficient Visual Correspondences Using Random Projections," IEEE, 2008.

Fischler et al., "Random Sample Consensus: a paradigm for model fitting with applications to image analysis and automated cartography," Communications of ACM, vol. 24, No. 6, pp. 381-395, 1981.

Gagie, "Compressing Probability Distributions," Inf. Process. Lett., vol. 97, No. 4, pp. 133-137, 2006.

Hua et al, "Discriminant Embedding for Local Image Descriptors," in Proc. of International Conference on Computer Vision (ICCV). IEEE Computer Society, 2007.

Jegou et al., "Hamming embedding and weak geometric consistency for large scale image search," in Proc. of European Conference on Computer Vision (ECCV), Berlin, Heidelberg, 2008, pp. 304-317.

Ke et al., "PCA-SIFT: A More Distinctive Representation for Local Image Descriptors," in Proc. Of Conference on Computer Vision and Pattern Recognition (CVPR), vol. 02. IEEE Computer Society, 2004, pp. 506-513.

Kingsbury, "Rotation-Invariant Local Feature Matching with Complex Wavelets," in Proc. European Conf. Signal Processing (EUSIPCO), 2006.

Klein et al., "Parallel tracking and mapping on a camera phone," in Proc. Eigth IEEE and ACM International Symposium on Mixed and Augmented Reality (ISMAR'09), Orlando, Oct. 2009.

Lowe, "Distinctive Image Features from Scale-Invariant Keypoints," International Journal of Computer Vision, vol. 60, No. 2, pp. 91-110, 2004.

Mikolajczyk et al., "A Comparison of Affine Region Detectors," Int. J. Comput. Vision, vol. 65, No. 1-2, pp. 43-72, 2005.

Mikolajczyk et al., "Performance Evaluation of Local Descriptors," IEEE Trans. Pattern Anal. Mach. Intell.,vol. 27, No. 10, pp. 1615-1630, 2005.

Nistér et al., "Scalable Recognition with a Vocabulary Tree," in IEEE Conference on Computer Vision and Pattern Recognition (CVPR), vol. 2, 2006, pp. 2161-2168.

Philbin et al., "Lost in quantization—Improving particular object retrieval in large scale image databases," in CVPR, Anchorage, Alaska, Jun. 2008.

Philbin et al., "Object Retrieval with Large Vocabularies and Fast Spatial Matching," in CVPR, Minneapolis, Minnesota, 2007.

Rosten et al., "Machine Learning for High Speed Corner Detection," in 9th Euproean Conference on Computer Vision, vol. 1, Apr. 2006, p. 430443.

Se et al., "Vision-Based Global Localization and Mapping for Mobile Robots," in IEEE Transactions on Robotics, vol. 21, No. 3, 2007, pp. 364-375.

Shakhnarovich et al., "Learning Task-Specific Similarity," Thesis, 2005.

Shakhnarovich et al., "Fast Pose Estimation with Parameter-Sensitive Hashing," in ICCV '03:Proceedings of the Ninth IEEE International Conference on Computer Vision. Washington, DC, USA: IEEE Computer Society, 2003, p. 750.

Snavely et al., "Photo Tourism: Exploring Photo Collections in 3D," in SIGGRAPH Conference Proceedings. New York, NY, USA: ACM Press, 2006, pp. 835-846.

Takacs et al.,"Feature Tracking for Mobile Augmented Reality Using Video Coder Motion Vectors," in ISMAR '07: Proceedings of the Sixth IEEE and ACM International Symposium on Mixed and Augmented Reality, 2007.

Taylor et al., "Robust Feature Matching in 2.3us," in Conference on Computer Vision and Pattern Recognition, Jun. 2009.

Taylor et al., "Multiple target localization at over 100 FPS," in British Machine Vision Conference, London, UK, Sep. 2009.

Tola et al., "A Fast Local Descriptor for Dense Matching," in Conference on Computer Vision and Pattern Recognition, 2008.

Torralba et al., "Small Codes and Large Image Databases for Recognition," in CVPR, 2008.

Tsai et al., "Rate Efficient Real Time CD Cover Recognition on a Camera Phone," in ACM Multimedia Vancouver, British Columbia, Canada, Oct. 2008.

Wagner et al., "Multiple target detection and tracking with guaranteed framerates on mobile phones," in ISMAR, Orlando, FL, USA, 2009.

(56) References Cited

OTHER PUBLICATIONS

Winder et al., "Learning Local Image Descriptors," in Computer Vision and Pattern Recognition, 2007. CVPR '07. IEEE Conference on, 2007, pp. 1-8. [Online]. Available: http://dx.doi.org/10.1109/CVPR.2007.382971.

Winder et al., "Picking the best Daisy," in Conference on Computer Vision and Pattern Recognition, 2009.

IEEE802.11—IEEE Standard for Information technology—Telecommunications and information exchange between systems—Local and metropolitan area networks—Specific requirements Part 11: Wireless LAN Medium Access Control (MAC) and Physical Layer (PHY) Specifications, Jun. 12, 2007.

IEEE802.15.1 IEEE Standard for Information Technology—Telecommuncations and Information exchange between systems—local and metropolitan area networks—specific requirements—Part 15.1: Wireless Medium Access Control (MAC) and Physical layer (PHY) Specifications for Wireless Personal Area Networks (WPANs), Jun. 15, 2005.

IEEE802.16—IEEE Standard for Local and metropolitan area networks Part 16: Air Interface for Broadband Wireless Access Systems, May 29, 2009.

International Search Report and Written Opinion of the International Searching Authority from corresponding Patent Cooperation Treaty Application No. PCT/IB2009/007434, dated Mar. 2, 2010, 18 pages.

International Search Report and Written Opinion, received in corresponding Patent Cooperation Treaty Application No. PCT/IB2010/055280, dated Mar. 4, 2011, 15 pages.

Brown, Matthew, "Multi-Image Matching using Multi-Scale Oriented Patches", Proceedings of the 2005 IEEE Computer Society Conference on Computer Vision and Pattern Recognition, 1063-6919/05. pp. 510-517.

Wagner, Daniel, "Pose Tracking from Natural Features on Mobile Phones", 7th IEEE International Symposium on Mixed and Augmented Reality, ISBN 978-1-4244-2859-5/08, Sep. 15-18, 2008. pp. 125-134.

Bay, Herbert, "Speeded-Up Robust Features (SURF)", In: Computer Vision and Image Understanding, ISSN 1077-3142, vol. 110 (2008), No. 3, pp. 346-359.

Wagner, Daniel, "Real-Time Detection and Tracking for Augmented Reality on Mobile Phones", In: IEEE Transactions on Visualization and Computer Graphics, ISSN 1077-2626, vol. 16, No. 3, May/Jun. 2010, pp. 355-368.

Takacs, Gabriel, "Unified Real-Time Tracking and Recognition with Rotation-Invariant Fast Features", In: 2010 IEEE Conference on Computer Vision and Pattern Recognition (CVPR), Jun. 13-18, 2010, pp. 934-941.

Office Action for Russian Application No. 2012124836/08(038029) dated Sep. 17, 2013.

Office Action for Korean Application No. 10-2012-7015881 dated Sep. 26, 2013.

* cited by examiner

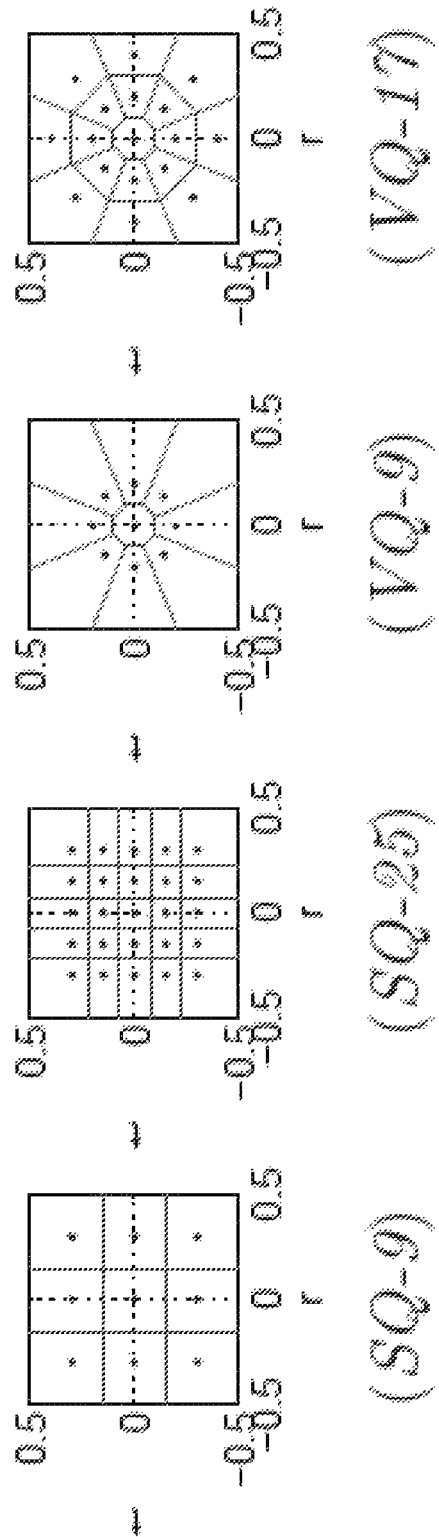

(Annuli)

(Polar)

(RGT)

(ARGT)

METHOD AND APPARATUS FOR TRACKING AND RECOGNITION WITH ROTATION INVARIANT FEATURE DESCRIPTORS

RELATED APPLICATION

This application claims priority benefit to U.S. Provisional Patent Application No. 61/262,740, filed Nov. 19, 2009 and is hereby incorporated by reference in its entirety.

TECHNICAL FIELD

Embodiments of the present invention relate generally to image processing, and, more particularly, relate to a method and apparatus for generating and utilizing feature descriptors for tracking and recognition.

BACKGROUND

In a number of applications, it has become desirable to be able to identify features within a series of images, such as video frames, and track the movement of the features within the images. For example, a series of video frames may be captured that include a distinctive object and it may be desirable to identify and track the relative movement of the object across the video frames and recognize the object in an automated fashion. In this regard, the identification of features within an image is utilized in computer vision applications, such as augmented reality. These applications are being increasingly utilized for real-time object recognition, three-dimensional reconstruction, panorama stitching, robotic mapping, and video tracking.

Handheld devices, such as mobile phones, are now commonly outfitted with video capturing capabilities. These video capturing capabilities can be leveraged for mobile and convenient computer vision applications, such as mobile augmented reality (MAR). However, in at least some instances, the processing power of a handheld device can be a limitation for the image processing capabilities of the handheld device.

BRIEF SUMMARY

Various example methods and apparatuses of the present invention are described herein for tracking and recognition with rotation invariant feature descriptors. According to some example embodiments, rotation invariant feature descriptors may be generated that are relatively inexpensive from a computation perspective, but also sufficiently robust to perform accurate tracking and recognition. Further, according to various example embodiments, the same feature descriptors that are utilized for tracking are also utilized for recognition.

One example method comprises generating an image pyramid of an image frame, detecting a plurality of interest points within the image pyramid, and extracting feature descriptors for each respective interest point. According to some example embodiments, the feature descriptors are rotation invariant. Further, the example method may also comprise tracking movement by matching the feature descriptors to feature descriptors of a previous frame and performing recognition of an object within the image frame based on the feature descriptors.

A related example apparatus for tracking and recognition with rotation invariant feature descriptors comprises at least one processor and at least one memory including computer program code, the at least one memory and the computer program code configured to, with the at least one processor, cause the apparatus at least to perform various functionalities. In this regard, the example apparatus is caused to perform generating an image pyramid of an image frame, detecting a plurality of interest points within the image pyramid, and extracting feature descriptors for each respective interest point. According to some example embodiments, the feature descriptors are rotation invariant. Further, the example apparatus may also be caused to perform tracking movement by matching the feature descriptors to feature descriptors of a previous frame and performing recognition of an object within the image frame based on the feature descriptors.

Another example embodiment is an example computer-readable storage medium having executable computer-readable program code instructions stored therein. The computer-readable program code instructions of the example computer-readable storage medium are for causing an apparatus to perform various functionalities. In this regard, the example apparatus is caused to perform generating an image pyramid of an image frame, detecting a plurality of interest points within the image pyramid, and extracting feature descriptors for each respective interest point. According to some example embodiments, the feature descriptors are rotation invariant. Further, the example apparatus may also be caused to perform tracking movement by matching the feature descriptors to feature descriptors of a previous frame and performing recognition of an object within the image frame based on the feature descriptors.

Another example embodiment is an example apparatus for tracking and recognition with rotation invariant feature descriptors. The example apparatus comprises means for generating an image pyramid of an image frame, means for detecting a plurality of interest points within the image pyramid, and means for extracting feature descriptors for each respective interest point. According to some example embodiments, the feature descriptors are rotation invariant. Further, the example apparatus may also include means for tracking movement by matching the feature descriptors to feature descriptors of a previous frame and means for performing recognition of an object within the image frame based on the feature descriptors.

BRIEF DESCRIPTION OF THE DRAWING(S)

Having thus described the invention in general terms, reference will now be made to the accompanying drawings, which are not necessarily drawn to scale, and wherein:

FIGS. 3a-3d illustrate segmentation of images into cells for binning according to an example embodiment of the present invention;

DETAILED DESCRIPTION

Figure 1:
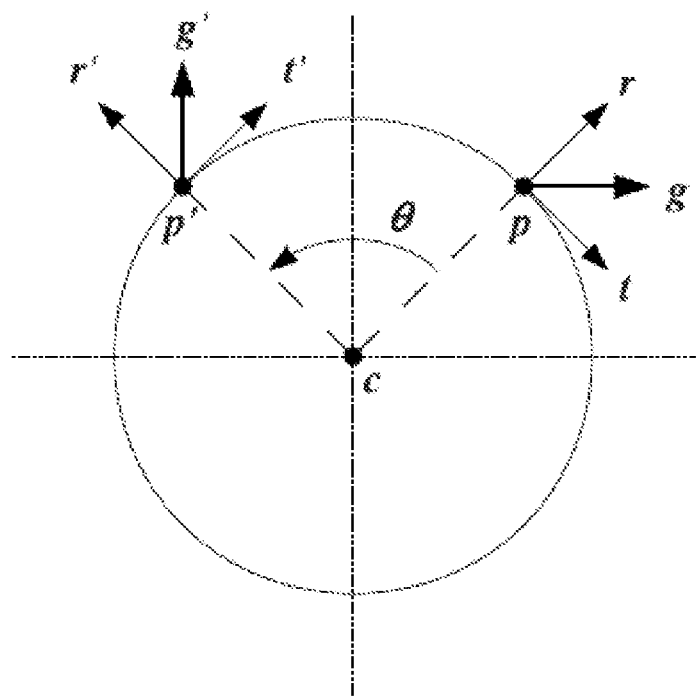
FIG. 1 illustrates the generation of radial gradients according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Example embodiments of the present invention include methods and apparatuses for unifying tracking and video content recognition in image processing applications, such as Mobile Augmented Reality (MAR) applications, using a feature descriptor generated as described herein. The feature descriptor may be referred to as a rotation invariant, fast feature (RIFF) descriptor. A RIFF descriptor may be generated using a radial gradient transform (RGT) and/or an approximate RGT (ARGT). According to various example embodiments, RIFF descriptors are generated fast enough for frame rate or near frame rate tracking, and robust enough for large scale recognition retrieval tasks. For example, according to some example embodiments, tracking schemes using RIFF descriptors are capable of generating a global affine motion-model comparable to these from a Kanade-Lucas-Tomasi (KLT) feature tracker, and can achieve improved recognition retrieval accuracy from a database of images.

Image processing applications, such as MAR applications, may utilize visual-tracking and recognition. Example embodiments of the present invention exploit the redundancy between frames for unifying tracking and recognition by generating feature descriptors that can be extracted at or near video frame rates and can be used for both tracking and recognition purposes. The feature descriptors according to example embodiments may be generated by extracting information at video frame rates that is useful for both recognition and tracking. By generating feature descriptors in this manner, both tracking and recognition may be supported by the feature descriptors. Additionally, to overcome the challenges involved with the limited computing power of many handheld device, the feature descriptors described herein, according to various example embodiments, are both robust and fast to compute.

The generation of a RIFF descriptor may begin with the procedure for forming a compressed histrogram of gradients (CHoG) descriptor, which has been shown to work well at very low bitrates. However, according to some example embodiments, the CHoG procedure may be modified to eliminate the orientation assignment phase of keypoint detection to increase speed, and generate the rotation invariant fast feature descriptor.

In this regard, two types of RIFF descriptors may be provided, descriptors based on gradient binning and descriptors based on spatial binning. Rotational invariance can be an important feature for robust image recognition systems. Some descriptors achieve orientation invariance by finding an orientation and interpolating the relevant pixels. However, according to example embodiments, the generation of RIFF descriptors may be performed without determining orientations and interpolation of pixels. In this regard, a histogram of gradients (HoG) type of descriptor may be utilized and rotation invariance may be achieved via gradient binning and spatial binning.

According to some example embodiments, gradient binning may be used to generate rationally invariant descriptors. To make gradient binning invariant, an invertable, spatially-varying transform may be applied. By rotating the gradients by a given angle, rotation-invariance may be achieved with little or no loss of information, yielding a radial gradient transform (RGT).

As shown in FIG. 1, two orthogonal basis vectors may be selected to provide a local, polar reference-frame for describing the gradient. The basis vectors, r and t, may be the radial and tangential directions at a point p, relative to the center of a patch, c. $R_\theta$ may be defined as the standard rotation matrix for the angle $\theta$, yielding:

$$r = \frac{p-c}{\|p-c\|}, t = R_{-\frac{\pi}{2}} r \quad (1)$$

By projecting onto r and t, the gradient, g, may be decomposed into its local coordinate system as:

$$g = (g^T r)r + (g^T t)t \quad (2)$$

such that the gradient can be represented in the local radial coordinate system as the vector $(g^T r, g^T t)$. If the patch is rotated about its center, c, by some angle, $\theta$, a new local coordinate system and gradient is generated as:

$$R_\theta p = p', R_\theta r = r', R_\theta t = t', R_\theta g = g'.$$

As such, the coordinates of the gradient in the local frame are therefore shown to be invariant to rotation, since g and g' map to the same coordinates in the respective reference frames.

$$(g'^T r', g'^T t') = ((R_\theta g)^T R_\theta r, (R_\theta g)^T R_\theta t) \qquad (3)$$
$$= (g^T R_\theta^T R_\theta r, g^T R_\theta^T R_\theta t)$$
$$= (g^T r, g^T t)$$

Figure 2:
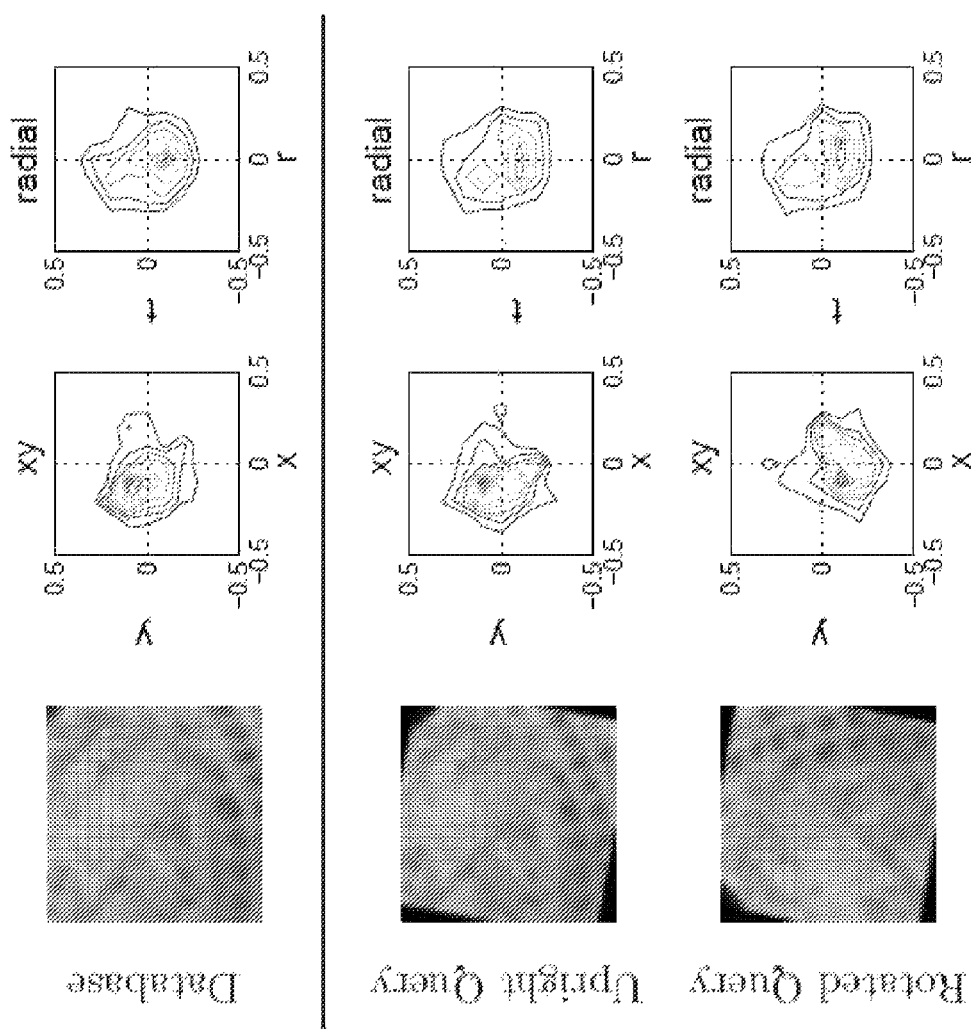
FIG. 2 illustrates rotational invariance using a radial gradient transform according to an example embodiment of the present invention.

Some or all of the gradients may therefore be rotated by the same angle, and $R_\theta$ may generate a one-to-one mapping. Thus, the set of gradients on any given circle centered around the patch may be invariant to rotation. FIG. 2 illustrates the rotational invariance due to implementation of the radial gradient transform. Referring to FIG. 2, a database patch (top left) produces a gradient histogram in both the xy (top middle) and radial (top right) domains. Similar histograms are extracted from an upright query patch (center left) and its rotated version (bottom left). It is noteworthy that the xy-gradient histograms (center column) rotate with the patch, while the radial-gradient histograms (right column) maintain the same shape across all rows.

Given these rotation-invariant gradients, a binning technique may be applied to produce histograms of gradients which comprise the descriptor. The gradient histogram may be binned to reduce the histogram's dimensionality to a reasonable size, while maintaining robustness. FIGS. 3a through 3d illustrate gradient binning centers and Voronoi cells which are used for generation of the RIFF descriptor. The bin centers (dots within the cells) and Voronoi cells can be used for histogram quantization. The vector quantizers (VQ), as depicted in FIGS. 3c and 3d, may be more flexible, while the scalar quantizers (SQ), as depicted in FIGS. 3a and 3b, may be faster.

Figure 4A:
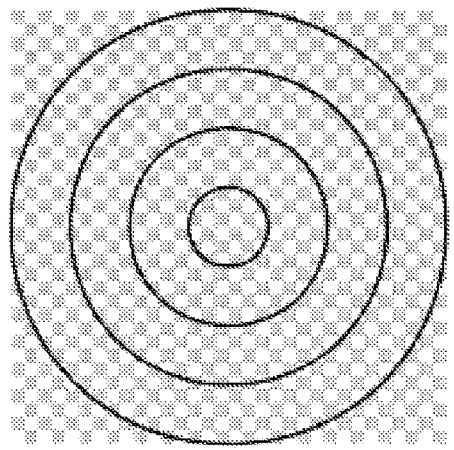
FIGS. 4a-4b illustrate spatial binning configurations according to an example embodiment of the present invention.
Figure 4B:
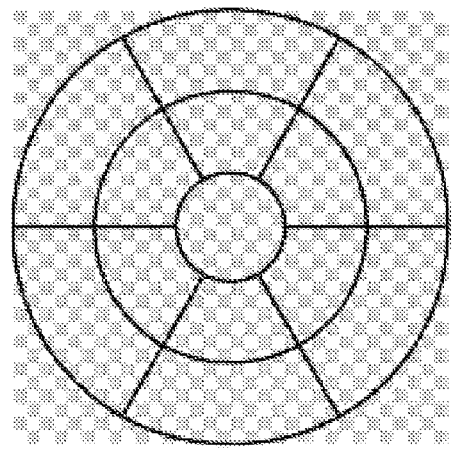

Having described rotation invariant gradient binning, spatial binning may be considered for generation of RIFF descriptors. Spatial binning may be made invariant by using annuli for the bins, such as the annuli depicted in FIG. 4a. Alternatively, the annuli may be subdivided into angular bins, yielding a polar configuration as depicted in FIG. 4b.

The polar spatial-binning technique, according to some example embodiments, can improve the robustness of a descriptor. However, orientation invariance may be lost. To regain orientation invariance, a distance measure, $D_{ori}$, may be used, which estimates a minimum distance, D, over some or all descriptor angles. Thus, if $D^\theta$ is a descriptor rotated by $\theta$, $$D_{ori}(\mathcal{D}_1, \mathcal{D}_2) = \min_\theta D(\mathcal{D}_1^\theta, \mathcal{D}_2). \qquad (4)$$

To implement polar spatial-binning, for example, six angular divisions may be used to coarsely provide a sampled estimate of distance versus angle. Quadratic interpolation may be used for a high accuracy angle and distance estimate.

Having described generation of RIFF descriptors using gradient binning and spatial binning to achieve orientation invariance, further modifications to the procedures are described to achieve increased speed of feature generation. Since orientation assignment has not been included in the generation of the features, the descriptors may be extracted directly from an upright patch around an interest point. As such, according to various example embodiments, the computationally expensive operation of pixel interpolation need not be performed.

Further, an approximated radial gradient transform may be utilized to decrease the computational expense of achieving orientation invariance via RGT. While in some embodiments, a RGT may be utilized, which may require a large number of floating point matrix multiplications with or with fixed-point arithmetic, an approximation may be alternatively used to reduce the computational load.

Figure 5A:
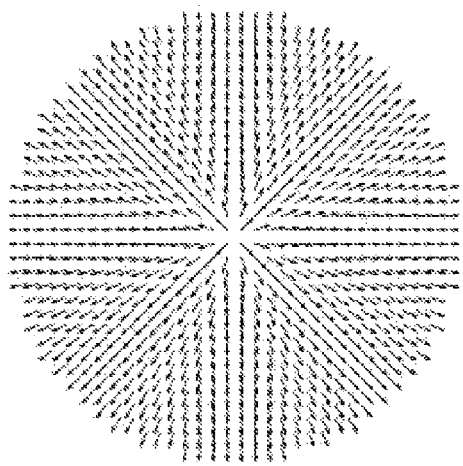
FIGS. 5a-5b illustrate radial gradient transform and approximated radial gradient transform basis vectors, respectively, according to an example embodiment of the present invention.
Figure 5B:
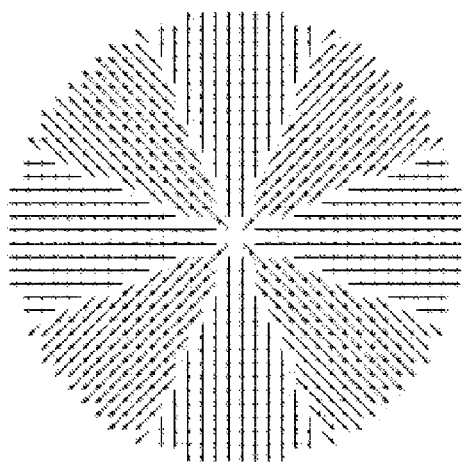

In this regard, r and t basis vectors can be approximated by a simpler pair, r̂ and t̂. Comparing FIG. 5a with FIG. 5b, it can be seen that the approximate basis vectors may be quantized to a given angle, such as 45 degrees as depicted in FIG. 5b. By doing so, the gradient may be directly computed along the respective direction with no additional cost, and an approximate radial gradient transform (ARGT) may be computed by finding the differences between neighboring pixels with the appropriate normalization.

Having computed the ARGT, a scalar quantization of the gradient histograms may be performed to construct the RIFF descriptor. According to some example embodiments, for speed, a 3×3 and 5×5 scalar quantizer may be utilized for the polar and annuli configurations, respectively, in place of vector quantizers. In some example embodiments, 100-dimensional annuli descriptors and/or 117-dimensional polar descriptors may be yielded.

According to various example embodiments, local HoG descriptors may capture statistics regarding image content around an interest point. Assuming the image content of two interest points is the same, then the distribution of gradients may also be similar. An underlying distribution may therefore be estimated by a histogram of samples, with more samples leading to an improved estimate. However, each sample may require computing and quantizing the gradient. Hence, a trade-off may exist between the speed of computation and the quality of the estimate, via the number of samples. To improve the speed, with minor degradation to the estimate, alternating pixels may be sampled around an interest point. FIGS. 4a and 4b indicate the alternating pixels via the checker-board pattern, where the pixels represented by the dark squares are sampled to estimate the HoG and the pixel represented by the light squares are not.

Further, the RIFF descriptor generated as described above, may unify tracking and recognition by using the descriptors for both tasks. For tracking, an interest point detector, such as a features from accelerated segment test (FAST) detector, on each level of an image pyramid may be implemented. According to some example embodiments, for speed, non-integer levels of the pyramid may be omitted, which provides sufficient coverage in scale space, while not requiring pixel interpolation beyond 2× downsampling. Further, according to some example embodiments, when the descriptors are used for recognition, any lack of coverage in scale space may be remedied by redundancy in the database.

For tracking, the RIFF descriptors may then be matched to spatially neighboring RIFF descriptors in a previous frame. If two descriptors fall within a fixed radius (e.g., 8 pixels) then the descriptors may be considered candidates for a match. A best candidate may then be selected as the one with the minimum distance in a descriptor domain, subject to a distance threshold. According to some example embodiments, Kullback-Leiber divergence may be used for matching performance.

For descriptor matching at very high frame rates, fast-hashing and spatial-binning of matching candidates may be performed according to the descriptors' location in the frame. In this regard, a frame may be divided into, for example, a spatial grid and the current frame's descriptors may be placed into bins associated with the portions of the grid from which the descriptors were detected. According to some example embodiments, descriptors may also placed into neighboring bins, such as the eight neighboring bins in a spatial grid. Performing binning in this manner may allow for fast lookup of spatial neighbors between frames. To determine matching candidates, the bins may be analyzed to determine which the current frame's bins includes the descriptor. According to some example embodiments, bins may contain a short list of some or all neighboring descriptors from the previous frame.

According to various example embodiments, the matching technique provides feature matches that are sufficiently robust and free of outliers, such that no outlier removal is required. In this regard, to track the global movement of the frame, a least-squares solution to an affine model may be computed between the current and previous frames.

Further, to support recognition functionality, a backlog of a previous frames' descriptors may be stored, along with any matches, and affine models. According to some example embodiments, having such a temporally dense information set may provide for achieving quality recognition with a modest number of descriptors per frame.

As mentioned above, the RIFF descriptors may also be used for recognition. In this regard, real time or near real time RIFF descriptor extraction and tracking may be performed, for example on a handheld device. Additionally, a buffer of past tracked features and global affine models may be generated. To generate the buffer, some example embodiments may extract 100 features per frame, and over the course of one second at 15 frames per second, 1500 features may be extracted and tracked. Based on the descriptors and their respective tracking information, video content recognition may be performed with respect to the buffer.

Further, according to some example embodiments, the unification of tracking and recognition via the same descriptors has the additional benefit of providing temporal coherency to the recognition data. Robustness of feature descriptors may be realized by examining the path of the descriptors through the video stream. Based on the tracking information, pruning of irrelevant data from the query features may be performed. In addition to pruning spurious interest points, the description of a robust interest point may be improved by obtaining more samples from neighboring frames.

For many applications, such as MAR applications, queries of the video stream may be performed against a local or remote database. Querying may be performed periodically at a regular interval, such as 1 Hz, or when significant new content is present in a frame. The presence of new content may be readily inferred from the tracking data.

For some MAR applications, location information, such as global positioning system location information, may be used to prefetch an appropriate local database for recognition. Prefetching a database in this manner may limit the size of the database for object recognition. Further, for some example embodiments, larger databases, such as compact disc or other object recognition databases, the tracking information may be compressed and queried to a server.

Based on the recognition techniques described above and otherwise herein, pair-wise image matching and retrieval performance may be achieved. According to some example embodiments, to perform recognition, interest points, such as difference of Gaussian (DoG) interest points, may be identified and respective descriptors may be extracted. Using the descriptors, a vocabulary tree may be trained. For example, if 600 interest points are extracted a tree having depth 6 and branch factor 10 may be constructed, resulting in a tree with 106 leaf nodes. Symmetric KL-divergence may be used for the distance measure for both training and querying. Alternatively, according to some example embodiments, a L2-norm for comparing HoG descriptors may be used. The KL-divergence may be incorporated into the k-means clustering framework because it is a Bregman divergence. For improved robustness, a soft-assignment of descriptors may also be used with respect to the 3 nearest centroids.

For querying, a similarity value may be computed between each query and database vector using, for example, the standard term frequency—inverse document frequency (TF-IDF) scheme that represents query and database images as sparse vectors of visual word occurrences. A weighting scheme may also be used, which reduces the contribution of less discriminative descriptors. Once a select set of images are selected from the TF-IDF voting, a pairwise match may performed to complete the recognition using, for example, a ratio-test and a random sample consensus (RANSAC).

The description provided above and generally herein illustrates example methods, example apparatuses for RIFF feature generation and for tracking and recognition using RIFF features. Example methods and example apparatuses may be implemented to achieve unified tracking and video content recognition with applications to MAR. RGT and its approximation may be utilized, yielding the rotation-invariant, fast feature (RIFF) descriptor. According to some example embodiments, the RIFF descriptors are fast enough for real time or near real time tracking, and robust enough for large scale retrieval tasks. At 26× the speed, for example, example embodiments of the tracking scheme described herein obtain a global affine motion-model comparable to that from the KLT. Additionally, according to some example embodiments, the models and feature matches used for tracking are also used to increase the robustness of video content recognition. By coupling tracking and recognition, mutual advantages in processing may be realized.

Figure 6:
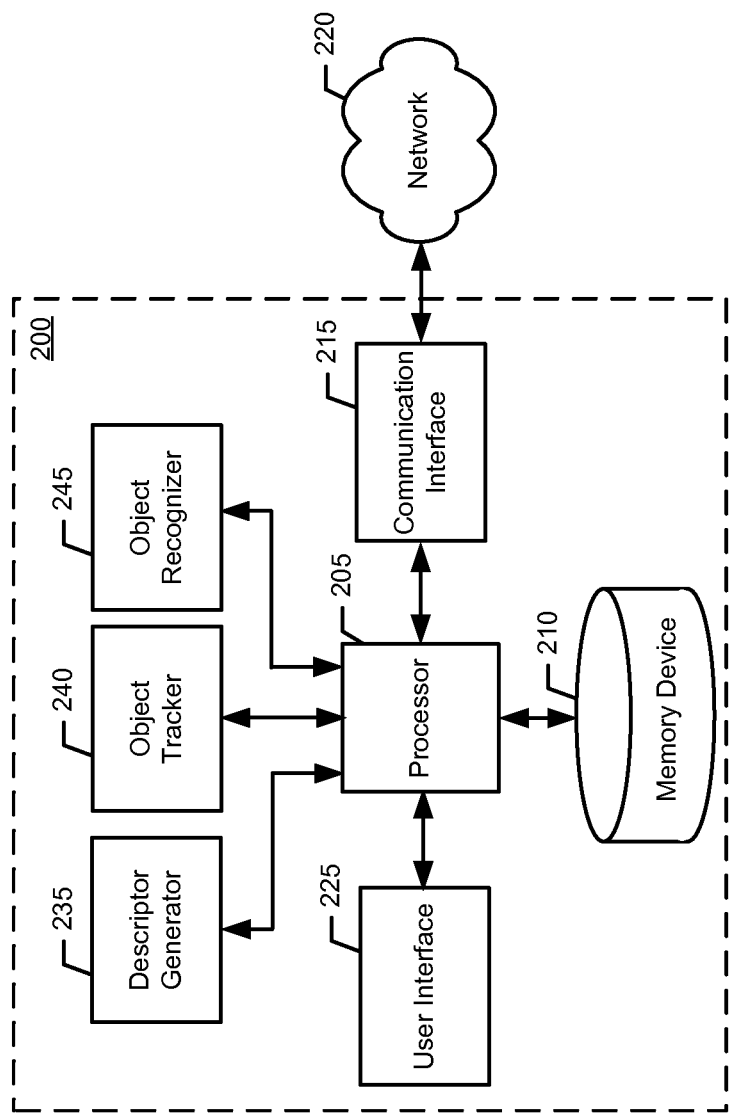
FIG. 6 illustrates a block diagram of an apparatus for tracking and recognition with rotation invariant feature descriptors according to an example embodiment of the present invention.
Figure 7:
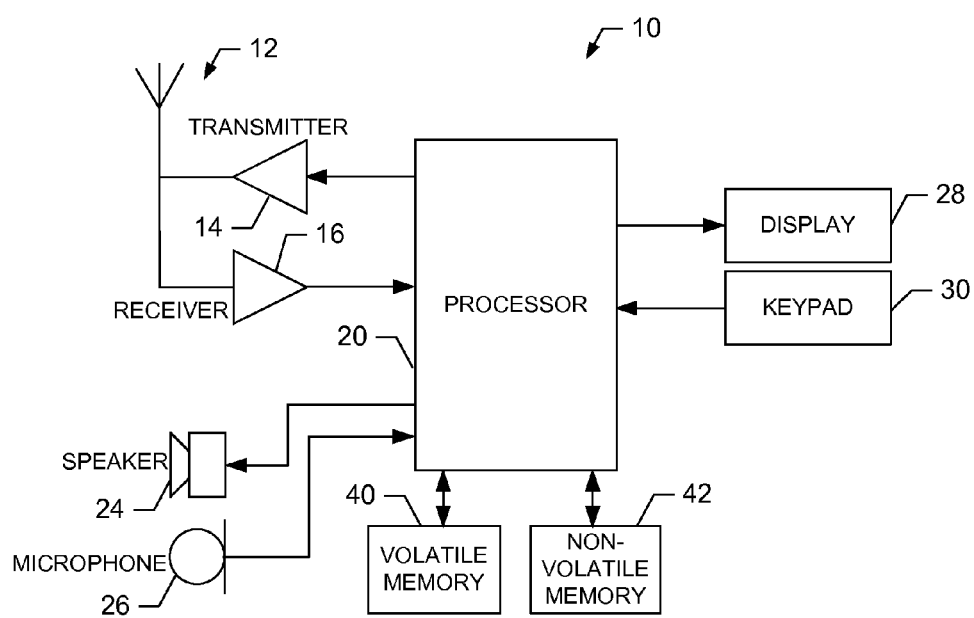
FIG. 7 illustrates a block diagram of a mobile terminal tracking and recognition with rotation invariant feature descriptors according to an example embodiment of the present invention.
Figure 8:
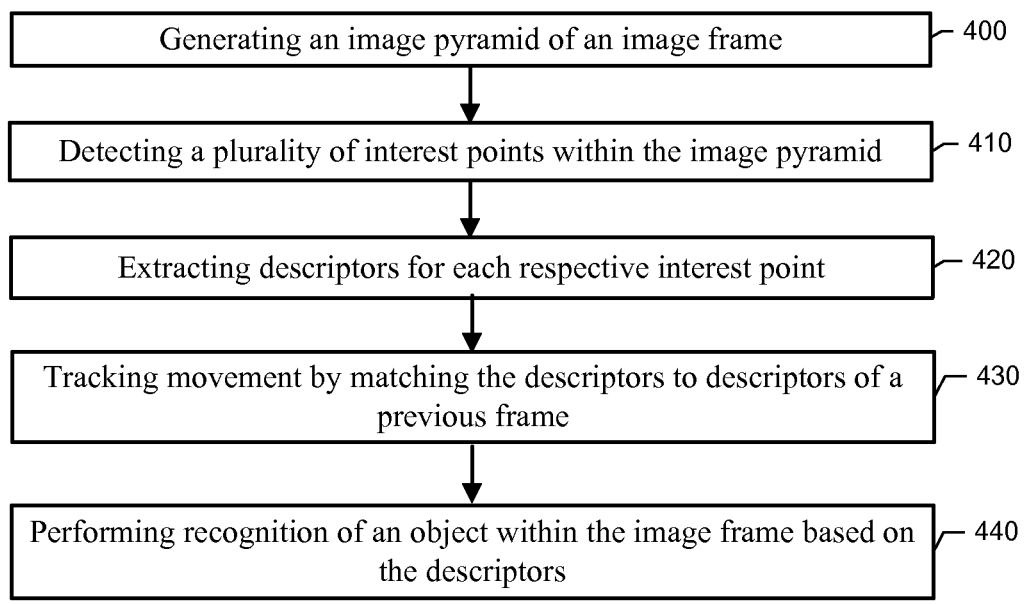
FIG. 8 illustrates a flow chart of a method for tracking and recognition with rotation invariant feature descriptors according to an example embodiment of the present invention.

Based on the forgoing, FIGS. 6 and 7 illustrate example apparatus embodiments of the present invention configured to perform the various functionalities described herein. FIG. 8 depicts an example method for tracking and recognition as described herein.

Referring now to FIG. 6, in some example embodiments, the apparatus 200 may be embodied as, or may be included as, a component of, a communications device with wired or wireless communications capabilities. In some example embodiments, the apparatus 200 may be part of a communications device such as a stationary or a mobile terminal. As a stationary terminal, the apparatus 200 may be part of a computer, server, an access point (e.g., a base station, wireless router, or the like), a device that supports network communications, or the like. As a mobile terminal, the apparatus 200 may be a mobile computer, mobile telephone, a portable digital assistant (PDA), a pager, a mobile television, a gaming device, a mobile computer, a laptop computer possibly with a wireless modem, a camera, a video recorder, an audio/video player, a radio, and/or a global positioning system (GPS) device, any combination of the aforementioned, or the like. Regardless of the type of communications device, apparatus 200 may also include computing capabilities.

The example apparatus 200 includes or is otherwise in communication with a processor 205, a memory device 210, an Input/Output (I/O) interface 206, a communications interface 215, user interface 220, and a source connection manager 230. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), other circuitry, and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a non-transitory computer-readable storage medium, or by a combination thereof, the processor 205 may be an entity capable of performing operations according to example embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a mobile terminal) configured for employing example embodiments of the present invention by further configuration of the processor 205 via executed instructions for performing the algorithms, methods, and operations described herein.

The memory device 210 may be one or more computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, software, or a combination of hardware and software that is configured to interface the processor 205 with other circuitry or devices, such as the communications interface 215 and the user interface 220. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 215 may be any device or means embodied in either hardware, a computer program product, or a combination of hardware and a computer program product that is configured to receive and/or transmit data from/to a network and/or any other device or module in communication with the example apparatus 200. In some example embodiments, the communications interface may be part of, or include, a wireless modem connected to a personal computer. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including, for example, a processor for enabling communications. Via the communication interface 215, the example apparatus 200 may communicate with various other network entities in a device-to-device fashion and/or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols, IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (MT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 215 may also be configured to support communications at the network layer, possibly via Internet Protocol (IP).

The user interface 220 may be in communication with the processor 205 to receive user input via the user interface 220 and/or to present output to a user as, for example, audible, visual, mechanical or other output indications. The user interface 220 may include, for example, a keyboard, a mouse, a joystick, a display (e.g., a touch screen display), a microphone, a speaker, or other input/output mechanisms. Further, the processor 205 may comprise, or be in communication with, user interface circuitry configured to control at least some functions of one or more elements of the user interface. The processor 205 and/or user interface circuitry may be configured to control one or more functions of one or more elements of the user interface through computer program instructions (e.g., software and/or firmware) stored on a memory accessible to the processor 205 (e.g., volatile memory, non-volatile memory, and/or the like). In some example embodiments, the user interface circuitry is configured to facilitate user control of at least some functions of the apparatus 200 through the use of a display and configured to respond to user inputs. The processor 205 may also comprise, or be in communication with, display circuitry configured to display at least a portion of a user interface, the display and the display circuitry configured to facilitate user control of at least some functions of the apparatus 200.

The descriptor generator 235, the object tracker 240, and/or the object recognizer 245 of example apparatus 200 may be any means or device embodied, partially or wholly, in hardware, a computer program product, or a combination of hardware and a computer program product, such as processor 205 implementing stored instructions to configure the example apparatus 200, memory device 210 storing executable program code instructions configured to carry out the functions described herein, or a hardware configured processor 205 that is configured to carry out the functions of the descriptor generator 235, the object tracker 240, and/or the object recognizer 245 as described herein. In an example embodiment, the processor 205 includes, or controls, the descriptor generator 235, the object tracker 240, and/or the object recognizer 245. The descriptor generator 235, the object tracker 240, and/or the object recognizer 245 may be, partially or wholly, embodied as processors similar to, but separate from processor 205. In this regard, descriptor generator 235, the object tracker 240, and/or the object recognizer 245 may be in communication with the processor 205. In various example embodiments, the descriptor generator 235, the object tracker 240, and/or the object recognizer 245 may, partially or wholly, reside on differing apparatuses such that some or all of the functionality of the descriptor generator 235, the object tracker 240, and/or the object recognizer 245 may be performed by a first apparatus, and the remainder of the functionality of the descriptor generator 235, the object tracker 240, and/or the object recognizer 245 may be performed by one or more other apparatuses.

The apparatus 200 and the processor 205 may be configured to perform the following functionality via the descriptor generator 235. The descriptor generator 235 may be configured to perform a number of operations of an example method, such as the example method depicted in FIG. 8. In this regard, the descriptor generator 235 may be configured to generate an image pyramid of an image frame at 400, and detect a plurality of interest points within the image pyramid at 410. The descriptor generator 235 may also be configured to extract feature descriptors for each respective interest point at 420. According to some example embodiments, the feature descriptors are rotation invariant. Further, according to some example embodiments, extracting the feature descriptors may include rotating gradients of an interest point by a given angle to yield a radial gradient transform. According to some example embodiments, extracting the feature descriptors may include performing gradient binning and/or spatial binning.

According to some example embodiments, extracting the feature descriptors may further include defining approximate basis vectors and utilizing the approximate basis vectors to generate an approximate radial gradient transform. In some example embodiments, descriptor may be selected for matching based on a threshold minimum distance between the descriptors.

The apparatus 200 and the processor 205 may be configured to perform the following functionality via the object tracker 240. The object tracker 240 may be configured to perform a number of operations of an example method, such as the example method depicted in FIG. 8. In this regard, the object tracker 240 may be configured to track movement by matching the feature descriptors to feature descriptors of a previous frame.

The apparatus 200 and the processor 205 may be configured to perform the following functionality via the object recognizer 245. The object recognizer 245 may be configured to perform a number of operations of an example method, such as the example method depicted in FIG. 8. In this regard, the object recognizer 245 may be configured to perform recognition of an object within the image frame based on the feature descriptors.

Referring now to FIG. 7, a more specific example apparatus in accordance with various embodiments of the present invention is provided. The example apparatus of FIG. 7 is a mobile terminal 10 configured to communicate within a wireless network, such as a cellular communications network. The mobile terminal 10 may be configured to perform the functionality of the apparatus 200 or other example apparatuses as described herein. More specifically, the mobile terminal 10 may be caused to perform the functionality of the descriptor generator 235, the object tracker 240, the object recognizer 245 and/or the operations of FIG. 8 via the processor 20. In this regard, processor 20 may be an integrated circuit or chip configured similar to the processor 205 together with, for example, the I/O interface 206. Further, volatile memory 40 and non-volatile memory 42 may configured to support the operation of the processor 20 as computer readable storage media.

The mobile terminal 10 may further include an antenna 12, a transmitter 14, and a receiver 16, which may be included as parts of a communications interface of the mobile terminal 10. The speaker 24, the microphone 26, the display 28, and the keypad 30 may be included as parts of a user interface. In some example embodiments, the mobile terminal 10 may include an image or video capturing unit, such as a camera module for capturing images or series of images.

Figure 9:
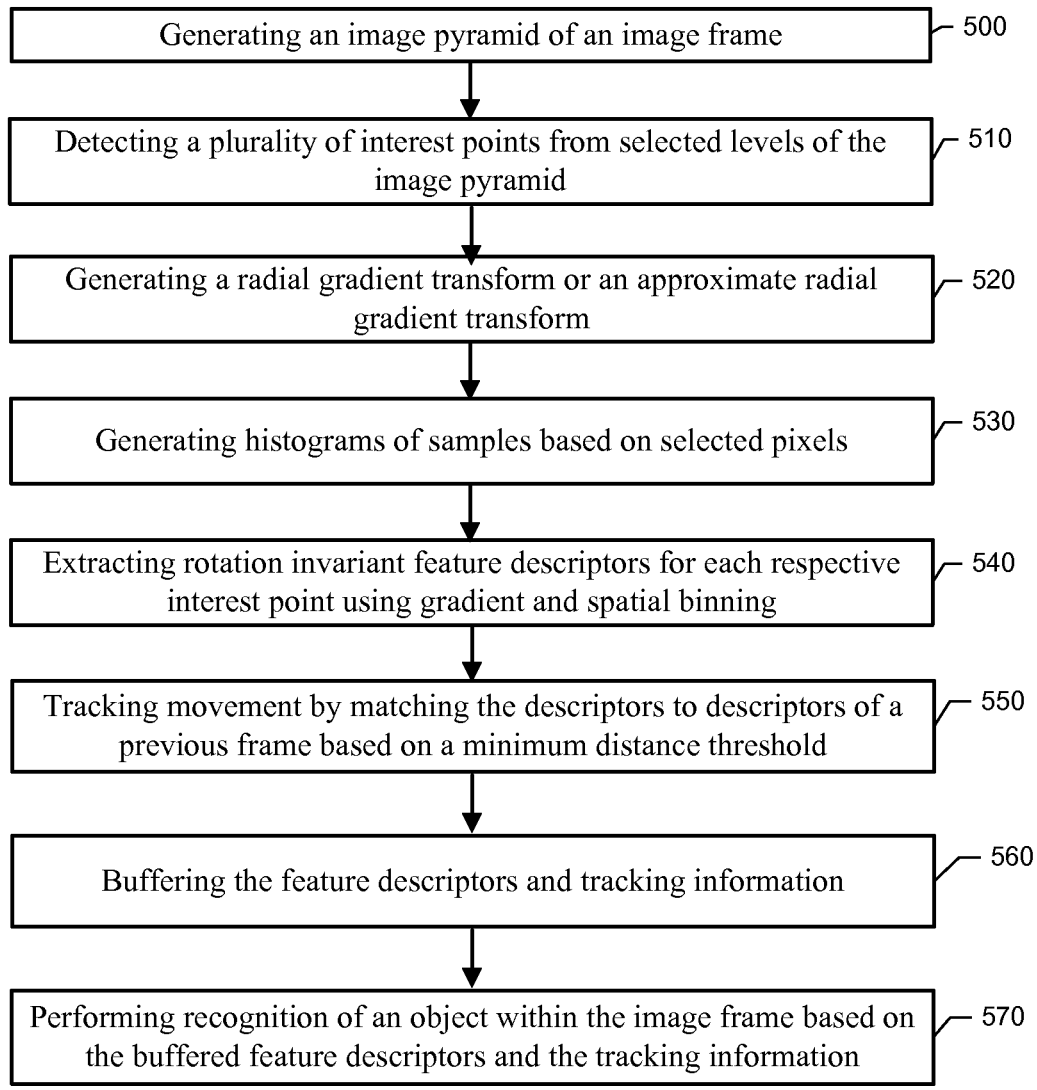
FIG. 9 illustrates another flow chart of a method for tracking and recognition with rotation invariant feature descriptors according to an example embodiment of the present invention.

FIG. 9 depicts another example method according to various example embodiments of the present invention. The example method of FIG. 9 may be performed by apparatus 200, processor 205, mobile terminal 10, or the like. The example method includes generating an image pyramid of an image frame at 500 and detecting a plurality of interest points from selected levels of the image pyramid at 510. The selected levels of the image pyramid may be integer levels of the image pyramid, and non-integer levels may be omitted. At 520, a radial gradient transform or an approximate radial gradient transform may be generated. Further, at 530, histograms of samples may be generated based on selected pixels. In this regard, alternating pixels may be utilized for histogram samples. At 540, rotation invariant feature descriptors may be for each respective interest point may be extracted using gradient binning and/or spatial binning. At 550, tracking movement may be performed by matching the descriptors to descriptors of a previous frame based on a minimum distance threshold. The example method may also include, buffering the feature descriptors and the tracking information at 560. At 570, recognition of an object within the image frame may be performed based on the buffered feature descriptors and the tracking information.

FIGS. 8 and 9 illustrate flowcharts of example systems, methods, and/or computer program products according to example embodiments of the invention. It will be understood that each operation of the flowcharts, and/or combinations operations in the flowcharts, can be implemented by various means. Means for implementing the operations of the flowcharts, combinations operations in the flowcharts, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions may be stored on a memory device, such as memory device 210, of an example apparatus, such as example apparatus 200, and executed by a processor, such as the processor 205. As will be appreciated, any such program code instructions may be loaded onto a computer or other programmable apparatus (e.g., processor 205, memory device 210, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the operations of the flowcharts in a computer-readable storage medium, support combinations of operations for performing the specified functions. It will also be understood that one or more operations of the flowcharts, and combinations of operations in the flowcharts, may be implemented by special purpose hardware-based computer systems and/or processors which perform the specified functions, or combinations of special purpose hardware and program code instructions.

The following provides additional example embodiments of the present invention. One example method in accordance with comprises generating an image pyramid of an image frame, detecting a plurality of interest points within the image pyramid, and extracting feature descriptors for each respective interest point. According to some example embodiments, the feature descriptors are rotation invariant. Further, according to some example embodiments, extracting the feature descriptors may include rotating gradients of an interest point by a given angle to yield a radial gradient transform. According to some example embodiments, extracting the feature descriptors may include performing gradient binning and/or spatial binning. According to some example embodiments, extracting the feature descriptors may further include defining approximate basis vectors and utilizing the approximate basis vectors to generate an approximate radial gradient transform. In some example embodiments, a descriptor may be selected for matching based on a threshold minimum distance between the descriptors.

A related example apparatus for tracking and recognition with rotation invariant feature descriptors comprises at least one processor and at least one memory including computer program code, the at least one memory and the computer program code configured to, with the at least one processor, cause the apparatus at least to perform various functionalities. In this regard, the example apparatus is caused to perform generating an image pyramid of an image frame, detecting a plurality of interest points within the image pyramid, and extracting feature descriptors for each respective interest point. According to some example embodiments, the feature descriptors are rotation invariant. Further, according to some example embodiments, extracting the feature descriptors may include rotating gradients of an interest point by a given angle to yield a radial gradient transform. According to some example embodiments, extracting the feature descriptors may include performing gradient binning and/or spatial binning. According to some example embodiments, extracting the feature descriptors may further include defining approximate basis vectors and utilizing the approximate basis vectors to generate an approximate radial gradient transform. In some example embodiments, descriptor may be selected for matching based on a threshold minimum distance between the descriptors.

Another example embodiment is an example computer-readable storage medium having executable computer-readable program code instructions stored therein. The computer-readable program code instructions of the example computer-readable storage medium are for causing an apparatus to perform various functionalities. In this regard, the example apparatus is caused to perform generating an image pyramid of an image frame, detecting a plurality of interest points within the image pyramid, and extracting feature descriptors for each respective interest point. According to some example embodiments, the feature descriptors are rotation invariant. Further, according to some example embodiments, extracting the feature descriptors may include rotating gradients of an interest point by a given angle to yield a radial gradient transform. According to some example embodiments, extracting the feature descriptors may include performing gradient binning and/or spatial binning. According to some example embodiments, extracting the feature descriptors may further include defining approximate basis vectors and utilizing the approximate basis vectors to generate an approximate radial gradient transform. In some example embodiments, descriptor may be selected for matching based on a threshold minimum distance between the descriptors.

Another example embodiment is an example apparatus for tracking and recognition with rotation invariant feature descriptors. The example apparatus comprises means for generating an image pyramid of an image frame, means for detecting a plurality of interest points within the image pyramid, and means for extracting feature descriptors for each respective interest point. According to some example embodiments, the feature descriptors are rotation invariant. Further, according to some example embodiments, extracting the feature descriptors may include rotating gradients of an interest point by a given angle to yield a radial gradient transform. According to some example embodiments, extracting the feature descriptors may include performing gradient binning and/or spatial binning. According to some example embodiments, extracting the feature descriptors may further include defining approximate basis vectors and utilizing the approximate basis vectors to generate an approximate radial gradient transform. In some example embodiments, descriptor may be selected for matching based on a threshold minimum distance between the descriptors.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising: generating an image pyramid of an image frame; detecting a plurality of interest points within the image pyramid; and extracting, via a processor, feature descriptors for each respective interest point, wherein extracting the feature descriptors includes extracting the feature descriptors that are rotation invariant and generated without determining orientations.

2. The method of claim 1, further comprising: tracking movement by matching the feature descriptors to feature descriptors of a previous frame; and performing recognition of an object within the image frame based on the feature descriptors.

3. The method of claim 1, wherein extracting the feature descriptors includes rotating gradients of an interest point by a given angle to yield a radial gradient transform.

4. The method of claim 1, wherein extracting the feature descriptors includes performing gradient binning or spatial binning.

5. The method of claim 1, wherein extracting the feature descriptors includes defining approximate basis vectors and utilizing the approximate basis vectors to generate an approximate radial gradient transform.

6. The method of claim 1, further comprising selecting at least one of the feature descriptors for matching based on a threshold minimum distance between the feature descriptors.

7. An apparatus comprising at least one processor and at least one memory including computer program code, the at least one memory and the computer program code configured to, with the at least one processor, direct the apparatus at least to: generate an image pyramid of an image frame; detect a plurality of interest points within the image pyramid; and extract feature descriptors for each respective interest point, wherein the feature descriptors are rotation invariant and generated without determining orientations.

8. The apparatus of claim 7, wherein the apparatus is further directed to: track movement by matching the feature descriptors to feature descriptors of a previous frame; and perform recognition of an object within the image frame based on the feature descriptors.

9. The apparatus of claim 7, wherein the apparatus directed to extract the feature descriptors includes being directed to rotate gradients of an interest point by a given angle to yield a radial gradient transform.

10. The apparatus of claim 7, wherein the apparatus directed to extract the feature descriptors includes being directed to perform gradient binning or spatial binning.

11. The apparatus of claim 7, wherein the apparatus directed to extract the feature descriptors includes being directed to define approximate basis.

12. The apparatus of claim 7, wherein the apparatus is further directed to select at least one of the feature descriptors for matching based on a threshold minimum distance between the feature descriptors.

13. The apparatus of claim 7, wherein the apparatus comprises a mobile terminal.

14. The apparatus of claim 13, wherein the apparatus includes a display configured to present object tracking based on the feature descriptors.

15. A non-transitory computer-readable storage medium having executable computer-readable program code instructions stored therein, the instructions being configured to cause an apparatus at least to: generate an image pyramid of an image frame; detect a plurality of interest points within the image pyramid; and extract feature descriptors for each respective interest point, wherein the feature descriptors are rotation invariant and generated without determining orientations.

16. The storage medium of claim 15, wherein the instructions are further configured to cause the apparatus to: track movement by matching the feature descriptors to feature descriptors of a previous frame; and perform recognition of an object within the image frame based on the feature descriptors.

17. The storage medium of claim 15, wherein the instructions configured to cause the apparatus to extract the feature descriptors include being configured to cause the apparatus to rotate gradients of an interest point by a given angle to yield a radial gradient transform.

* * * * *